(12) United States Patent
Onchi Navarro et al.

(10) Patent No.: US 12,318,725 B2
(45) Date of Patent: Jun. 3, 2025

(54) SYSTEMS AND METHODS FOR EXTRACTING VOLATILE COMPONENTS FROM PRODUCE

(71) Applicant: Brown International Corporation, LLC, Winter Haven, FL (US)

(72) Inventors: Victor Francisco Onchi Navarro, Davenport, FL (US); Carlos Valentin Gallo, Tafi Viejo-Tucuman (AR); Roger Waters, Auburndale, FL (US); Clarissa Albarran, Lakeland, FL (US); Tony Tedesco, Lakeland, FL (US)

(73) Assignee: Brown International Corporation, LLC, Winter Haven, FL (US)

( * ) Notice: Subject to any disclaimer, the term of this patent is extended or adjusted under 35 U.S.C. 154(b) by 781 days.

(21) Appl. No.: 17/545,005

(22) Filed: Dec. 8, 2021

(65) Prior Publication Data

US 2022/0176269 A1    Jun. 9, 2022

Related U.S. Application Data

(60) Provisional application No. 63/123,029, filed on Dec. 9, 2020.

(51) Int. Cl.
*B01D 5/00* (2006.01)
*A23N 1/02* (2006.01)
*C11B 9/02* (2006.01)
*A23N 15/06* (2006.01)

(52) U.S. Cl.
CPC .............. *B01D 5/009* (2013.01); *A23N 1/02* (2013.01); *C11B 9/02* (2013.01); *A23N 15/06* (2013.01)

(58) Field of Classification Search
CPC .......... A23N 15/06; A23N 1/02; A23N 1/003; B01D 5/009; B01D 5/0093; B01D 11/0288; B01D 11/0296; C11B 9/02
See application file for complete search history.

(56) References Cited

U.S. PATENT DOCUMENTS

| | | | | |
|---|---|---|---|---|
| 2,527,364 A | * | 10/1950 | Koffler | A23L 27/13 99/534 |
| 3,183,825 A | | 5/1965 | James | |
| 3,486,548 A | * | 12/1969 | Todd | B01D 1/22 159/13.1 |
| 3,707,176 A | | 12/1972 | Bushman | |
| 3,857,983 A | | 12/1974 | Roth | |
| 4,470,344 A | | 9/1984 | Bushman | |

(Continued)

OTHER PUBLICATIONS

Patent Cooperation Treaty, PCT/US2021/062303, International Search Report & Written Opinion of the International Searching Authority, dated Feb. 23, 2022.

*Primary Examiner* — Reginald Alexander
(74) *Attorney, Agent, or Firm* — Jones Day (57) ABSTRACT

Systems and methods are provided for a system for extracting volatile components from produce. In an embodiment, a conveying mechanism is configured to transit produce from a first point to a second point, where a peel of the produce is penetrated during said transit such that a portion of volatile components in the produce peel are released from the peel as a vapor. A hood is positioned over the conveying mechanism for capturing the vapor, where the system is configured to extract at least a portion of the volatile components of the vapor captured via the hood.

17 Claims, 8 Drawing Sheets

(56) References Cited

U.S. PATENT DOCUMENTS

| | | | | |
|---|---|---|---|---|
| 5,338,557 | A * | 8/1994 | Pare | C11B 9/025 |
| | | | | 426/430 |
| 7,622,140 | B2 * | 11/2009 | Whittle | B01D 11/0242 |
| | | | | 426/494 |
| 8,017,171 | B2 * | 9/2011 | Sample | A23L 5/21 |
| | | | | 426/489 |
| 2018/0249754 | A1 | 9/2018 | DeVito | |
| 2020/0347318 | A1 | 11/2020 | Brochet et al. | |
| 2021/0170302 | A1 * | 6/2021 | Sherwood | B01D 11/0296 |
| 2022/0347596 | A1 * | 11/2022 | Alsayar | B01D 11/0257 |

* cited by examiner

| KNIT MESH DESCRIPTION | |
|---|---|
| NOMINAL DIAMETER | 12.896" |
| MESH STYLE | 9001 |
| MESH MATERIAL | 304L |
| MESH THICKNESS | 10" |
| GRID MATERIAL | 304L |
| NUMBER OF SEGMENTS | 1 |

Fig. 8B

SYSTEMS AND METHODS FOR EXTRACTING VOLATILE COMPONENTS FROM PRODUCE

PRIORITY CLAIM

This application claims priority to U.S. Provisional Application No. 63/123,029, filed Dec. 9, 2020, the entirety of which is incorporated herein by reference.

BACKGROUND

In addition to being a food source, produce often contains a number of other substances that provide utility and value. For example, peels and rinds of citrus and other fruits and vegetables may contain substances, such as essential oils, that are often used as flavorings or aromas. Such byproducts often have significant value, even in very small quantities.

BRIEF DESCRIPTION OF THE DRAWINGS

Aspects of the present disclosure are best understood from the following detailed description when read with the accompanying figures.

DETAILED DESCRIPTION

Systems and methods as described herein can, in embodiments, increase collection yield of certain food (e.g., produce) byproducts, such as essential oils of citrus fruits. Substantial quantities of those byproducts may be found in peels of that produce (e.g., oranges, sweet oranges, lemons, limes, pumelo, grapefruit, bergamot, mandarin, papeda, citron). When such peels are penetrated (e.g., punctured, perforated, or otherwise pierced), the byproducts are released (e.g., oil cell sacs on epicarp of citrus fruits, have a turgidity that when it is mechanically expressed releases its content with certain pressure into the atmosphere). A portion of the byproducts are typically released as a liquid. But because of the volatile nature of these byproducts, a portion is often released as a vapor (e.g. as organic volatile components). Because the byproducts may be valuable in small quantities, collecting the portion of the byproducts released as a vapor is worthwhile. Further, because the byproducts, when released as a vapor in abundant quantities, may be irritating or otherwise damaging to people (e.g., persons operating machines) or be considered detrimental to the environment, capture of these byproducts released as a vapor has further benefits. Systems and methods as described herein can, in embodiments, increase the capture of valuable byproducts in a manner that the recovery of those byproducts (e.g., by 2-4% or more) and the enriches the value of the finished product. Such systems and methods may increase sustainability by reducing the amount of byproducts released into the atmosphere, increasing safety, reducing damage to persons and property, and reducing energy requirements (e.g., reducing energy requirements for ventilating fumes during oil extraction.

Systems and methods as described herein provide mechanisms for accessing oil glands from citrus fruit peel, including increasing yield from peel oil access systems by enabling capture of volatile organic compounds (VOCs) introduced into the atmosphere by an oil extraction machine (e.g., an oil extraction machine as described in one of U.S. Pat. Nos. 3,954,032; 4,070,959; 6,994,018, 10,492,520, incorporated by reference herein in their entirety) in which the extractor includes parallel horizontal toothed rolls submerged underwater and running at differential speeds to penetrate the oil glands in the fruit and cause release of oil into a pan of water. In particular U.S. Pat. No. 6,994,018 is a citrus oil extractor in which each roll is driven independently with a separate motor in which each motor speed is controlled using a variable frequency drive (VFD) programmed to control motors based on parameters including the type of fruit to be processed. This drive mechanism allows variation in the speed at which citrus passes through the extractor.

Systems and methods include, in examples, an oil extraction process in which the oil/water mixture leaving the oil extractor, along with rinse water from drying rolls, passes through a straining device, such as a paddle finisher or parabolic static screen to remove large debris such as broken fruit pieces or other debris from the fruit, and then into a first stage centrifuge separator. The first stage separator functions to remove insoluble solids (bowl discharge) and to enrich the oil/water emulsion (light phase) to a final concentration which is typically 80 to 90% oil by weight (oil rich emulsion). The enriched emulsion is further processed through a clarifying type centrifuge (polisher) to separate remaining insoluble solids and water from the oil. In some cases, such as in the recovery of lemon oil and other valuable oils, a second stage separator may be set up between and in series with the first stage and polisher centrifuges. With the two stages separator configuration the back pressure on the middle phase is adjusted to produce an emulsion with a concentration level between 65 and 70% oil in water, which may increase overall centrifuge efficiency and reduce oil losses as compared to just a single stage separator. The aqueous phase, which may be the bulk of water used in the process and often referred to as the heavy or middle phase from the first stage separator centrifuge, is returned to the oil extractor primarily for the purpose of water conservation and reduced waste disposal. In some examples, as in an example case of lemon oil recovery processes, 90 to 95% of the water is returned to the extractor from the centrifuges whereas 5% to 10% of the water is either carried out with the fruit or discharged out the first stage separator along with the sludge and emulsion streams. The recirculation of the middle phase to the extractor has an additional advantage of preserving some of the valuable flavor components of the oil, in particular lemon oil, which would otherwise be partially soluble in the water resulting in loss of the components. A circulation rate to the first stage separator centrifuge and back to the extractor may be adjusted to achieve a concentration of oil in water from the centrifuge typically ranging from 0.5 to 2.0% by weight whereas the preferred concentration is typically 0.8 to 1.1% by weight. The middle phase stream from the first stage separator centrifuge, which typically has a residual oil content of 0.05% to 0.2% oil by weight, is returned to the extractor in order to reduce overall water usage in the process and preserve water soluble components. The middle phase is returned to the bottom of the extractor pan at the fruit discharge end of the extractor and flows toward the fruit inlet end of the extractor and over a weir which maintains a constant level of liquid near the top of the rolls. With this arrangement of continuous fluid flow to the extractor, the oil/water liquid, commonly referred to as oil liquor, increases in oil content as it transverses the extractor whereas the oil in the fruit is being continuously depleted as it passes across each subsequent group of rolls.

The amount of oil that can be removed from the fruit depends on a number of factors which includes, but not limited to, roll speeds both axial and radial, fruit retention time, water temperature, oil concentration in contact with the fruit and available centrifuge capacity. Other variables affecting oil removal include fruit variety, maturity, size, shape, softness and unusual surface aberrations such as those caused by disease.

Analytical methods presently used by the Citrus Industry have indicated that, in the case of lemon oil extraction, 86 to 92% of the available oil in the fruit can be removed by systems and methods, depending on fruit quality. Whereas "in Drum Oil Yields" are typically lower than theoretical as determined by analytical procedures, in some instances "In the Drum Recoveries" higher than the theoretical have been observed when processing lemons. The discrepancy between the actual and theoretical values indicates that there may be more oil in lemon fruit than is presently being measured and that in most cases the extraction efficiencies are lower than reported.

The type of equipment and extraction techniques can have a direct impact on the quality of citrus oils. The value of lemon oil, in particular, is related to the aldehyde content—typically the higher the aldehyde content the higher the value of the oil. Although fruit characteristics are the primary factor in the quantity and composition of aldehydes in the oil, extraction techniques can have a direct bearing on loss of aldehydes. Systems and methods described herein may preserve aldehydes due to low consumption of water which in turn reduces solubility and loss of aldehydes.

It is believed that native oil (e.g., still in the fruit) can have a higher aldehyde and other high value components than is presently being measured in extracted oil and therefore there can be a potential of further reducing losses of such components in the extraction process and increasing the value of the oil. In addition, there may be highly volatile compounds in citrus, such as ethyl butyrate, acetaldehyde, sabinene, linalool, octanal and a-Thujene just to mention a few, that can add to the fruit aroma of citrus oils but are believed to be susceptible to being lost through evaporation in certain processing processes.

Systems and methods described herein, can in embodiments, include a chamber installed above the extracting rolls of an oil extraction machine with a sprinkler system that function as a first condensation trap for the OVC vapors. This chamber may contain an exhaust tube, located on the front part of the oil extractor, where the oil liquor is discharged. This exhaust tube may include a fan on the upper end to create an air flow that will induce uncondensed residual vapors to go into the tube. This tube will may include a coalescence trap that can provoke micro drops to aggregate and form larger drops in a coalescence action that will create the condensation of the OVC vapors. To complement this action, a second water mist may be utilized in the exhaust tube above coalescence trap. Once OVC vapors are condensed they may fall into the main liquor flow and will be integrated onto the next downstream process, centrifugation and separation of the finished essential oil.

Figure 8A:
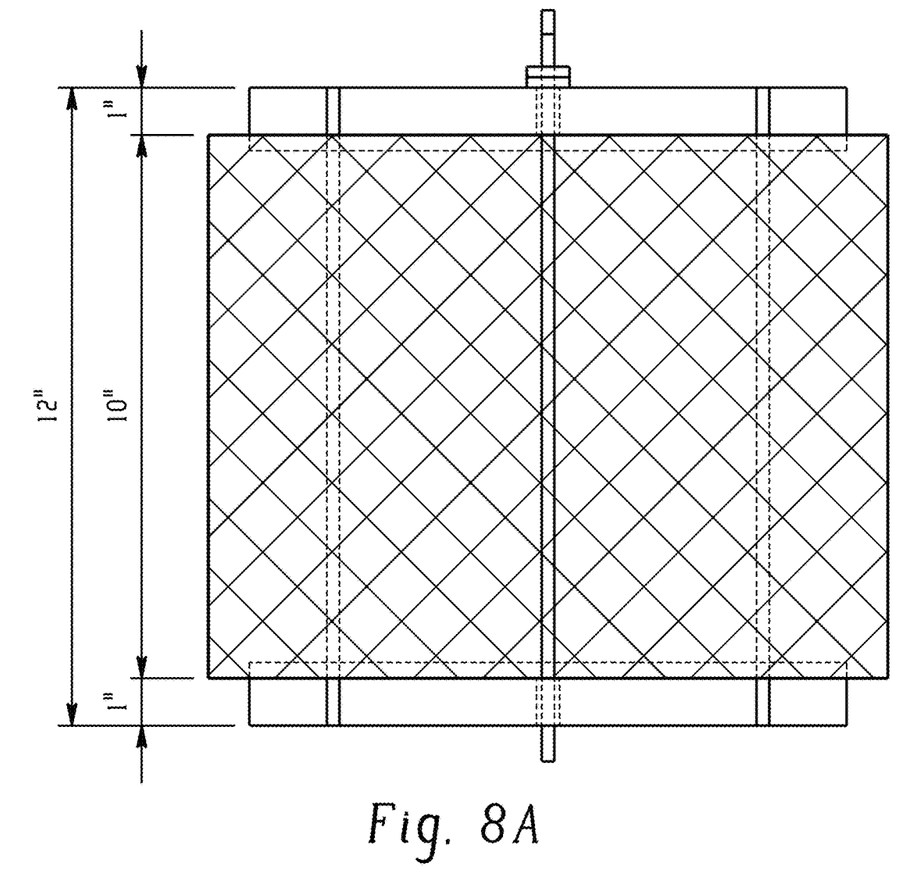
FIGS. 8A and 8B depict example dimensions and materials of example coalescence traps, where in one embodiment, multiple size coalescence traps (segments) may be utilized to provide desired results.
Figure 8B:
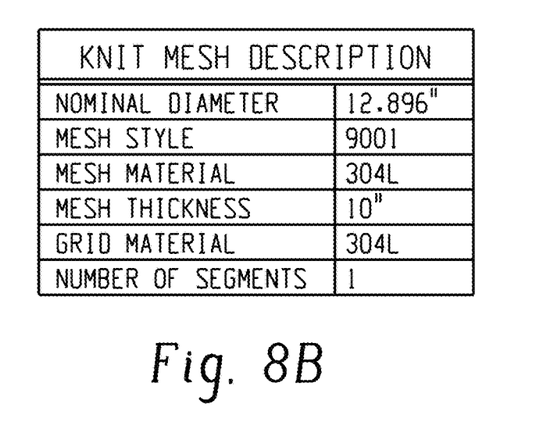

In one example, the material of the coalescence trap is formed from a structured metal packing material. That material may be similar or the same as materials used on distill fractionating columns. In embodiments, the material is made out of stainless-steel, stainless steel alloy, or corrosion resistant (e.g., titanium) wire gauze packing. The material may provide an effect that provides an extremely wettable surface for low-surface-tension liquids with low gas flow resistance. In one example, a coalescence trap is formed to be 12 inches diameter by 10 inches high. FIGS. 8A and 8B depict example dimensions and materials of example coalescence traps, where in one embodiment, multiple size coalescence traps (segments) may be utilized to provide desired results.

Figure 1:
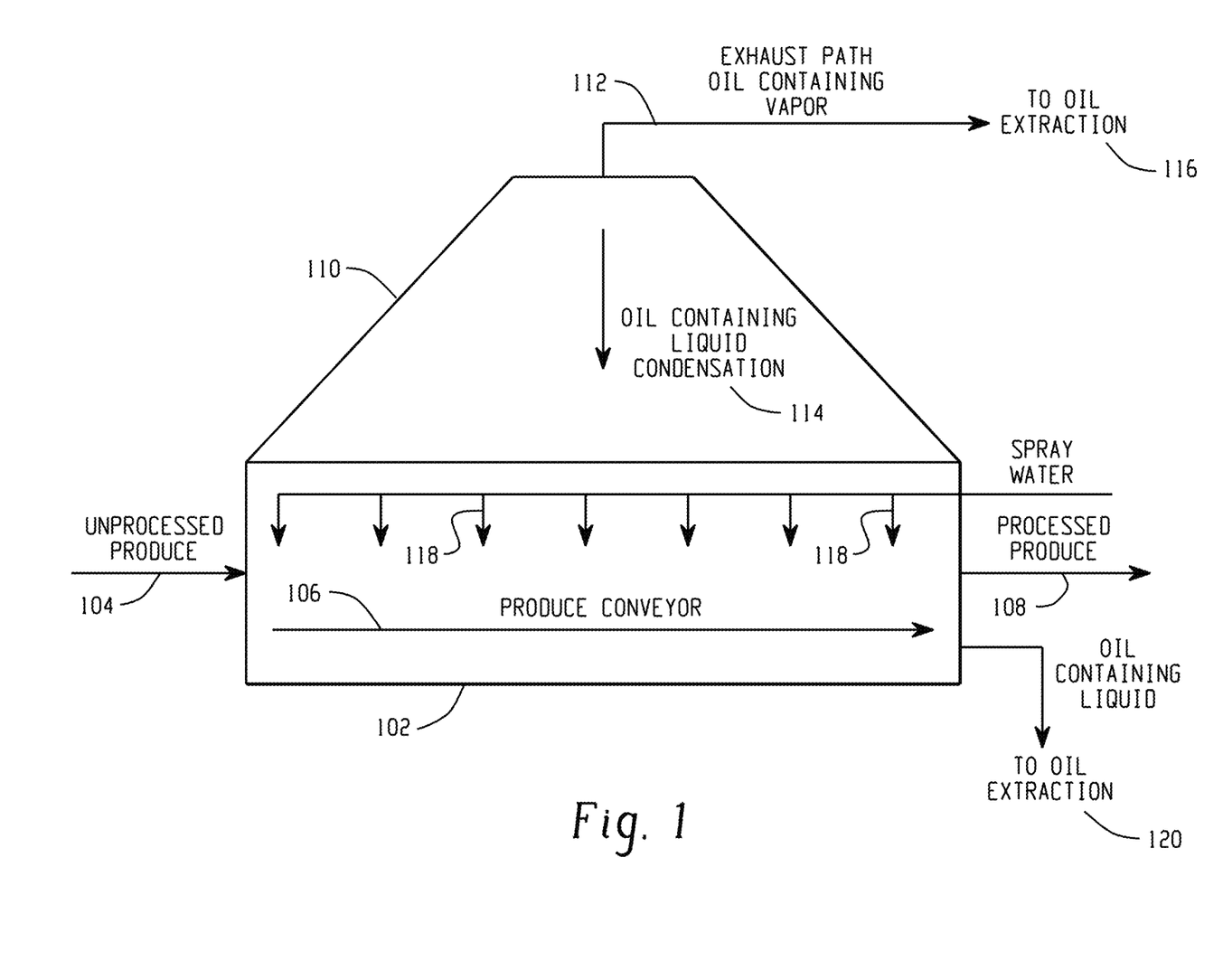
FIG. 1 is a diagram depicting a system for extracting volatile components from produce in accordance with an embodiment.

FIG. 1 is a diagram depicting a system for extracting volatile components from produce in accordance with an embodiment. The system includes an enclosure 102, where unprocessed produce 104 is introduced at one end of the enclosure (e.g., via a first covered chute). A conveying mechanism 106 (e.g., a series of rollers all rolling in a common direction, a series of rollers where most of the rollers are rolling in a common direction, a conveyor belt) is configured to transit the unprocessed produce 104 from a first point near where the produce 104 is introduced into the enclosure to a second point near where processed produce 108 exits the enclosure 102, such as via a second covered chute). Before or during transit by the produce conveyor, a peel of the produce is crushed or penetrated, such that a portion of volatile components in the produce peel are released. In embodiments, the peel is penetrated via teeth, spines, sharp points, or an abrasive coating (e.g., carborundum or garnet grit) on the conveying mechanism 106, such as penetration mechanisms affixed to rollers or a conveyor belt. Typically, a portion of the volatile components are released as a liquid, while a portion of the volatile components are released from the peel as a vapor. The system includes a hood 110 positioned over the conveying mechanism 106 for capturing the vapor.

The system is configured to extract at least a portion of the volatile components of the vapor captured via the hood 110. In one example, the hood 110, or an exhaust path 112 to which the hood directs the vapor includes components (e.g., a coalescing material positioned in the exhaust path with a mist spray providing liquid onto the coalescing material via a spray nozzle) configured to encourage condensation of the vapor containing the volatile components, such that condensation 114 falls back toward the enclosure 102 for collection. In another example, alternatively or in conjunction with the condensation encouraging components, a portion of the vapor may transit the exhaust path 112 (e.g., using a fan positioned to induce airflow through the exhaust path, for condensation and oil extraction as indicated at 116. In one example, the system includes wash nozzles (e.g., rotary wash nozzles) positioned within the enclosure 102 or hood 110 configured to spray water or other liquid (e.g., cleaning liquid) onto inside surfaces of the enclosure 102 and hood 110.

The system of FIG. 1 further includes components configured to collect liquid forms of produce byproducts, such as volatile components emitted from the produce as a liquid, as well as condensation 114 containing volatile components induced by the hood 110 and exhaust path 112. In one example, the system includes a plurality of wash nozzles 118 that are configured to spray a liquid into the enclosure 102 (e.g., onto the conveying mechanism 106). That liquid captures some of the volatile components by washing them from the produce as it traverses the conveyor 106. Liquid from a lower portion of the enclosure, below or in some cases up to or submerging the produce on the conveying mechanism 106, is extracted at 120 for extraction of those volatile components. That liquid extracted at 120 may include liquid from wash nozzles 118 (e.g., low volume cone type nozzles that facilitate a water drench of the produce) as well as condensation 114 of vapor containing volatile components that falls back into the enclosure 102.

Figure 2:
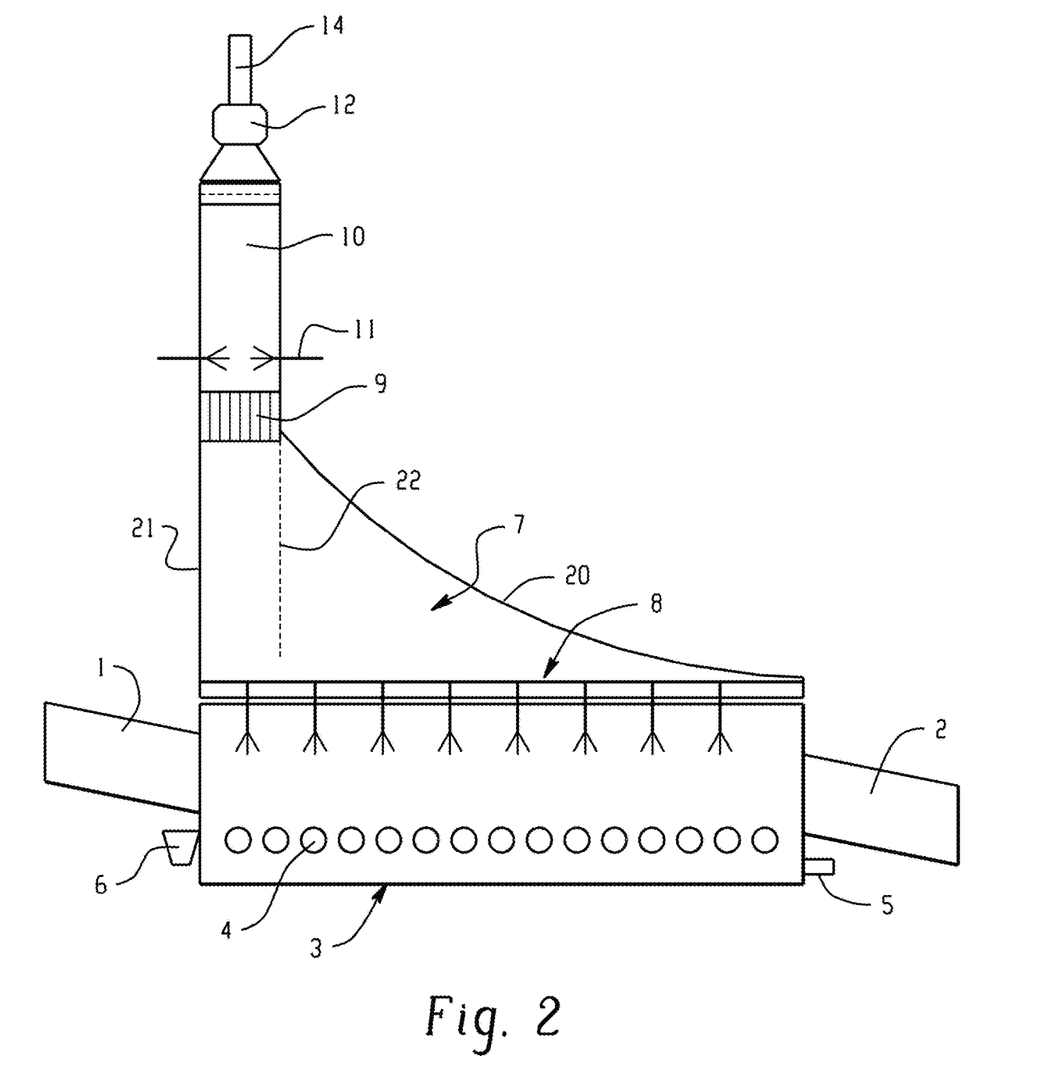
FIG. 2 is a diagram depicting a second example embodiment of a system for extracting volatile components from produce.

FIG. 2 is a diagram depicting a second example embodiment of a system for extracting volatile components from produce. The example includes a plurality of rolls 4 which are used to extract essential from oil glands located in the peel (exocarp) of citrus fruit. The bed of rolls 4 are submerged in water to allow capture of oil as it is being extracted. The oil is subsequently separated from the water by centrifugation. A portion of the water may be returned to the system at 5 after centrifugation in order to conserve on the amount of fresh water needed for the process and to reduce waste disposal. Both chutes 1, 2 may be completely shrouded so as to minimize escape of vapors out of the system. The fruit in the extractor may not self-convey and utilize on displacement by incoming fruit in order to move through the system. An overhead conveying system may be provided for moving fruit out of the system at the end of the fruit run. In addition to rotation the rolls 4 may also reciprocate perpendicular to the direction of rotation. The combination of rotation and reciprocation of rolls 4 as well as spinning of fruit as it crosses the rolls increase the turbulence of water the rolls 4 are submerged in and is believed to be a factor of increasing the evaporation rate of oil and water. Additional factors on evaporation rate of water and volatile components in the system include, but are not limited to, ambient air temperature, relative humidity, temperature of water in the system, temperature of water in drench system, fruit rate through system, and an amount of oil removed from fruit. Certain of these factors may be controlled to limit evaporation as desired.

The example of FIG. 2 includes a hood 7 installed overran enclosure that functions to reduce vapors from escaping out the top of the system and a system 9, 10, 11, 12, 14 of coalescing the vapors back to oil droplets and water droplets back into to the system. The example of FIG. 4 further includes components configured for enrichment and recovery of OVC's as a separate product. The hood may take a variety of forms. In the example of FIG. 2, one surface 20 of the hood 7 has a parabolic shape configured to efficiently direct vapor flow from the entrance end of the system (near chute 1) where oil concentrations are highest to the coalescing system in preference to the vapors from the discharge end of the system (near chute 2) where oil concentrations are lower. A second surface 21 of the hood 7 in that example is defined by a vertical wall. In another example, a first surface 22 of the hood 7 takes a vertical wall form as does the second surface 21, such that the hood 7 takes the shape of a vertical tube. A variety of other shaped hoods may be utilized including those where a surface of the hood has a parabolic, dome, semispherical, trapezoidal, rectangular parallelepiped, trapezoidal prism, rectangular, tubular, or pyramidal shape.

In the example of FIG. 2, vapor flow is increased in an upward flow using a small speed-controlled fan 12 installed in top of the stack and into a coalescing filter 9. In addition to the coalescing filter 9 a low volume water drench system 8 is installed just above the rolls 4 to capture and return volatile components back into the system. The system can be operated with or without the drench system depending on condensation inducing efficiency via the hood 7. The vapors in the hood 7 are pulled up by a small speed-controlled fan 12 and pass into a coalescing filter 9 for capture of remaining vapors.

The filter is composed of, in an example, a finely woven stainless-steel mesh material designed to be highly efficient in coalescing oil droplets. The filter used may be capable of coalescing up to 99.9% of the vapors into oil droplets for return back to the system. Other types of packing materials can be utilized. A water misting system 11 may be provided over the filter 9 in order to flush oil droplets out of the filter 9.

Specifically, in one example with reference to FIG. 2, fruit enters the oil extractor enclosure 3 through a sloped chute 1 and exits through a sloped chute 2. Both chutes may be completely shrouded so as to minimize escape of vapors out of the extractor. The rolls 4 submerged under water in the extractor all rotate in same direction but at different speeds. The enclosure 3 is initially filled with water prior to starting the processing of fruit. Water level in the system is maintained by an adjustable weir which spills over into a trough 6. Water continues to be introduced to the enclosure, spills over weir, and then is pumped to a straining device, typically a paddle finisher, for removal of fruit debris during processing of fruit. From the straining device the water (referred to as feed liquor) is delivered to a tank and then pumped to a separator type centrifuge for separating the bulk of the oil (oil rich emulsion) and particular matter (sludge). The water from the centrifuge (commonly referred to as middle phase phase) containing a small amount of oil is recirculated back to enclosure through an inlet tube 5 located at the bottom of the enclosure pan on the fruit discharge end of the enclosure 3. As the fruit passes across the rollers 4 the oil content of the fruit is progressively depleted whereas the middle phase returning to the enclosure 3 at 5 is progressively enriched with oil removed from the fruit. The enclosure has a hood 7 with a parabolic sloped side, in one example, designed to focus vapors from the area of high oil concentration in preference to vapors from the area of lower concentration near the discharge end of the system (e.g., a Brown Oil Extractor ("BOE")). Low volume water drench nozzles, usually with cone shaped spray, are installed on a manifold 8 for the purpose of contacting atomized oil droplets and vapors (fumes) and subsequently allowing the water and oil to fall back into the system. In addition to recovery of evaporated or atomized droplets utilizing the low volume drench nozzles, an oil coalescing filter 9 is installed at top of hood to recover highly volatile components that are not recovered by the water drench system. The coalescing filter is typically a finely woven stainless-steel mesh material. In one example, the mesh material is the Sulzer material designed to remove 99.9% of the vapors. In addition to the filter water misting nozzles 11 are provided to condense any vapors which may pass through the filter mesh as a result of overloading the filter or other conditions which may reduce the efficiency of the filter. In order to facilitate positive flow of air and oil vapors up the filter a small speed-controlled fan is installed 12 in a stack exhaust path 10 above the water misting nozzles. Air, which has been depleted of OVC's is discharged to the through a tube 14. The air from the tube can be further directed out of the oil extraction room to the outside atmosphere.

Figure 3:
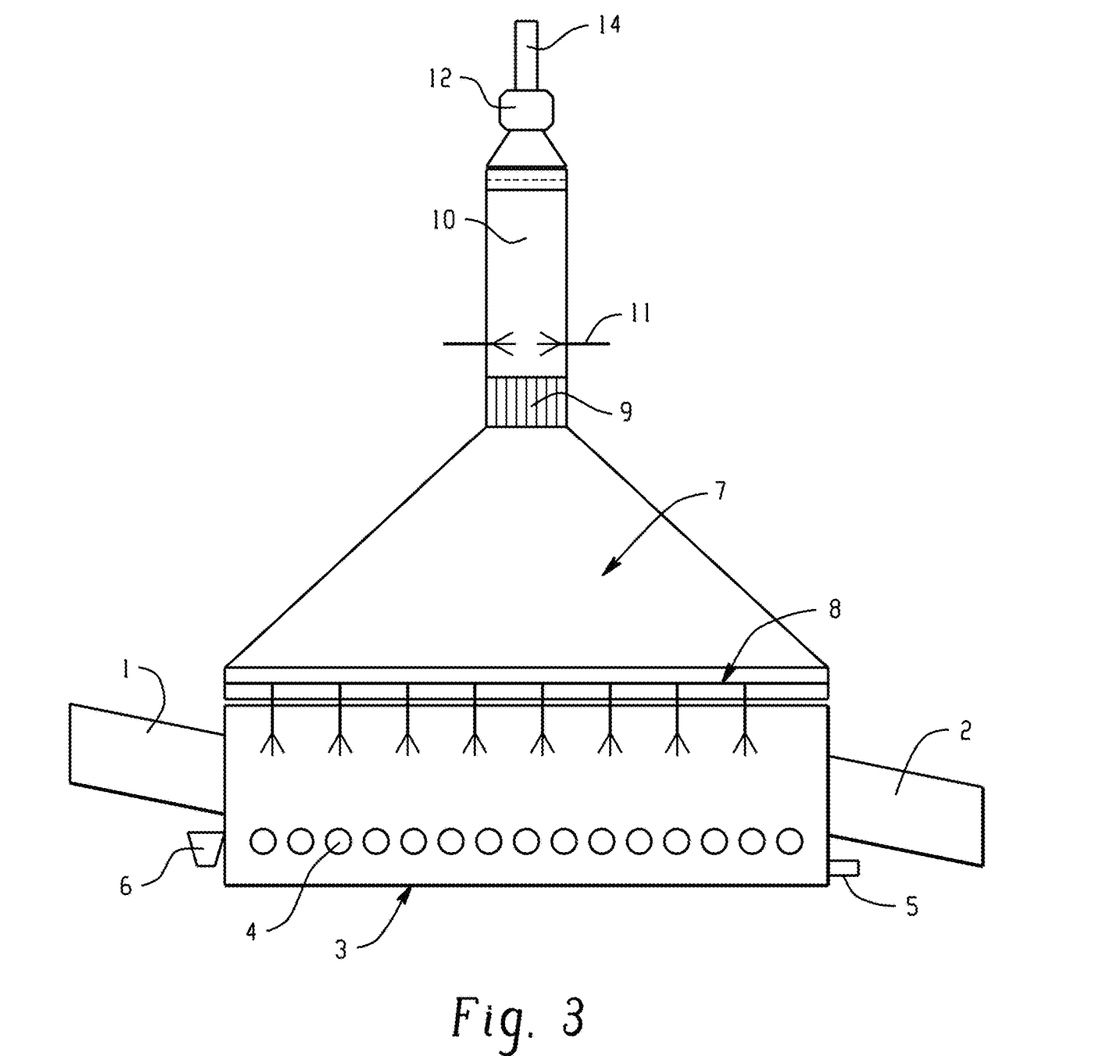
FIG. 3 is diagram depicting a third example system for extracting volatile components from produce.

FIG. 3 is diagram depicting a third example system for extracting volatile components from produce. In that example, the hood 7 is structured as a pyramid shaped hood. Certain aspects of the example of FIG. 3 function similarly to those of the example of FIG. 2. The shape of the hood 7 in the FIG. 3 example gives preference to collection of vapor from the center of the system rather than the inlet end of the system.

Figure 4:
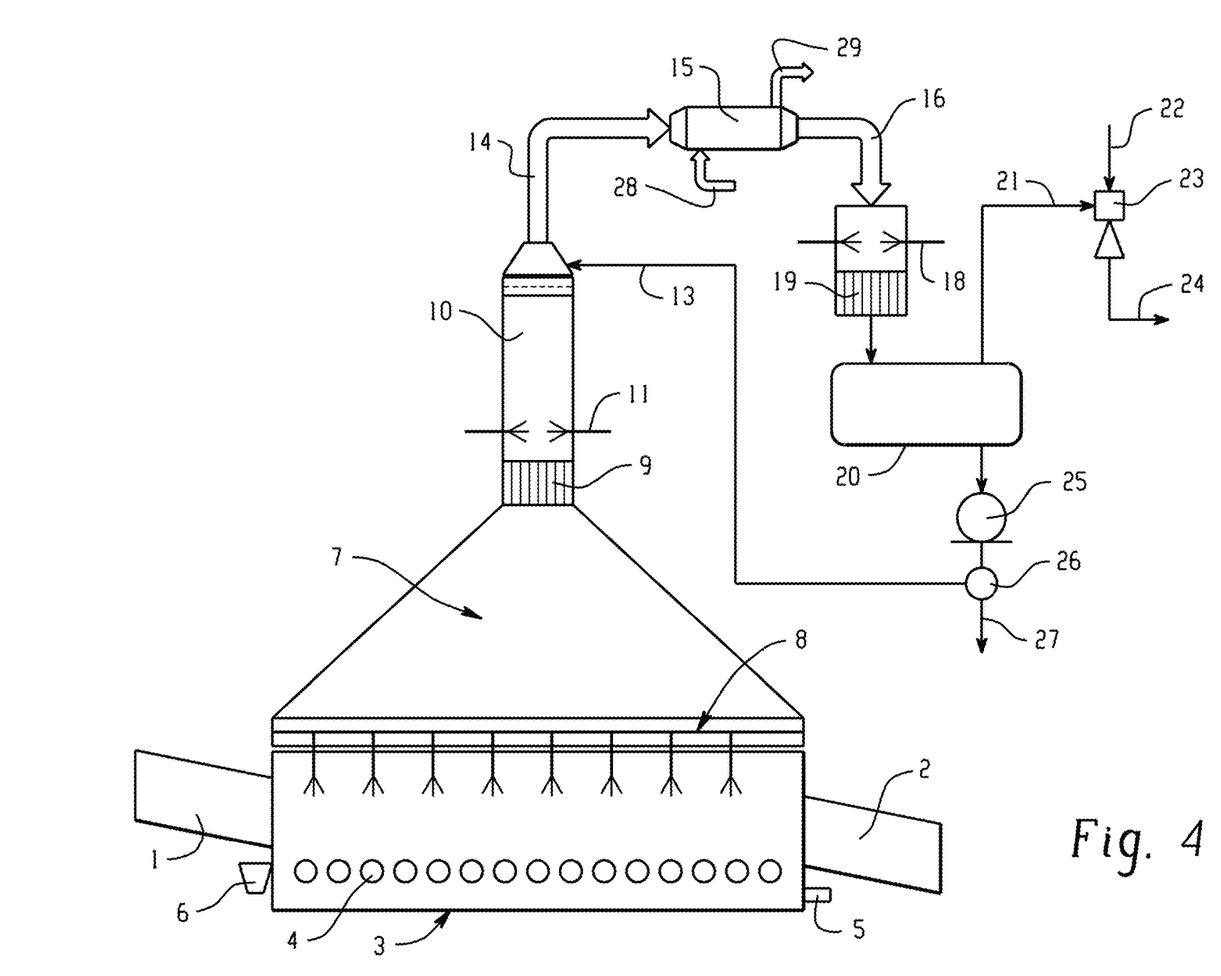
FIG. 4 is a diagram depicting a third example of a system for extracting volatile from produce that includes a secondary coalescing system.

FIG. 4 is a diagram depicting a third example of a system for extracting volatile from produce that includes a secondary coalescing system. There, a secondary high efficiency coalescing system in which vapors are drawn up the stack 10 and into a tube in shell type condenser 15 using vacuum produced from a smalls steam jet 23 rather than a fan. The vapors are cooled using refrigerated water at 18 and allowed to flow through a secondary filter system for further coalescing any higher volatile components at 20 which may not be condensed in the condenser 15. In this example, volatile components can be enriched by recirculating (refluxing) the stream back to the top of the stack 10 via 13. In addition, or alternatively, enriched vapors can be removed and recovered separate from re-introducing them back to the system via line 27.

Specifically, in one example, an auxiliary volatile organic components recovery system is installed above the stack exhaust path 10 which allows separation and recovery of some of the oil components of higher volatility and value in order to induce vapors through the coalescing system. A small steam jet 23 may be used to induce airflow. The system can be operated with or without the water drench systems and with or without the coalescing filter 9 depending on capacity and efficiency required and chemical composition of components desired. The vapor passes up through a tube 14 and into a tube/shell type condenser 15. Water, preferably chilled 28 is introduced into the condenser and discharge back via a pipe 29 to chiller or to drain. Condensed organic volatile component vapors and water pass through a secondary misting system 18 and coalescing filter 19 as an addition or alternative to the primary misting system 11 and filter 9 in the exhaust path 10. Condensed water and vapor flow into an accumulator 20. A slight vacuum may be pulled from top of accumulator through a pipe 21 to a small steam jet 23, in which steam is introduced 22 at a controlled pressure allowing condensed steam to discharge to drain 24. The condensate is pumped out of the accumulator via small pump 25 and is sent through a three-way automated valve to the vapor stack exhaust path 10 for refluxing and enriching vapors or to separate highly enriched component 27 as a separate high value mixture of volatile components.

Figure 5:
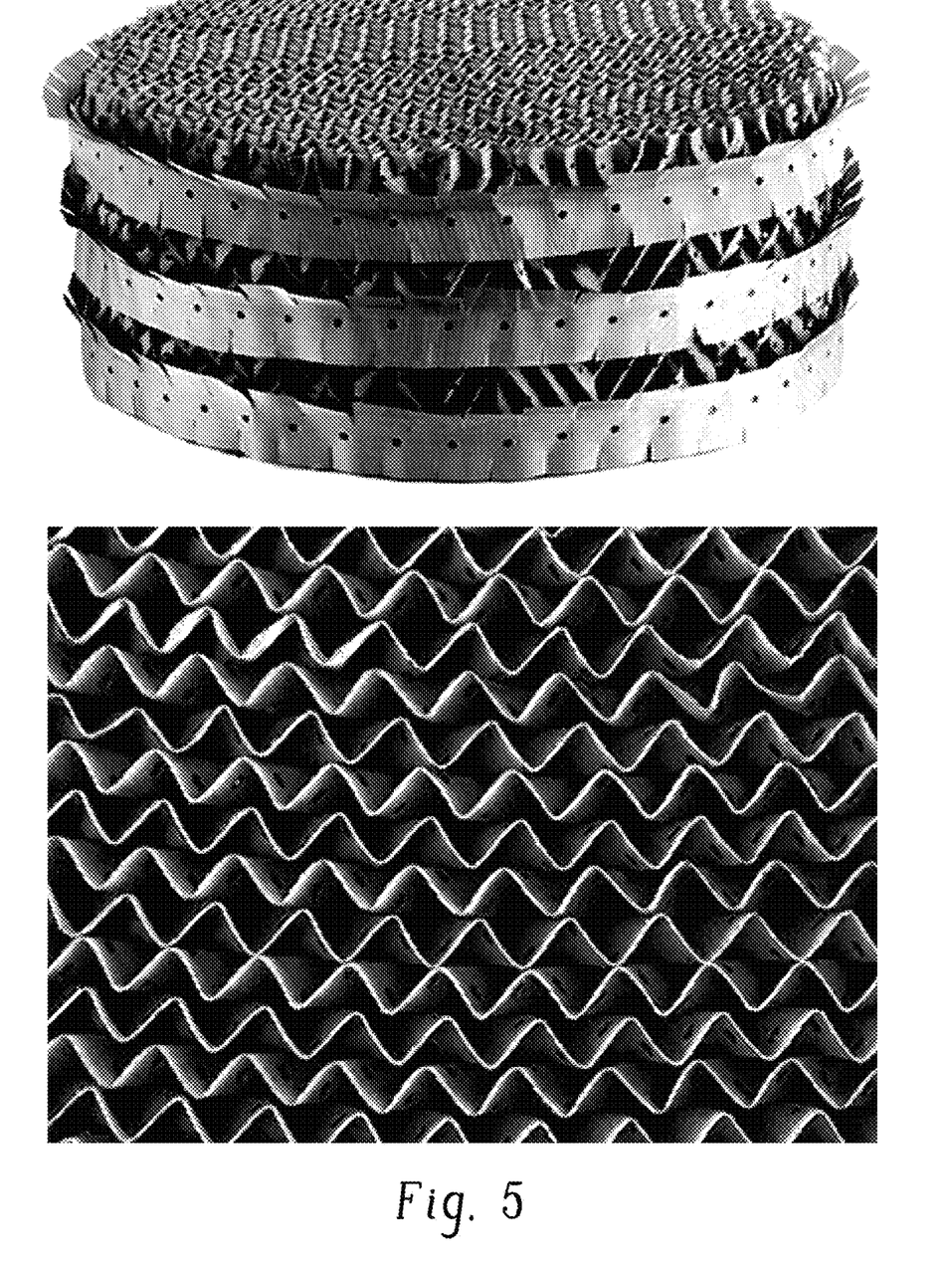
FIGS. 5 and 6 provide example form factors for coalescing materials that may be positioned within an exhaust path to encourage condensation of volatile component containing vapors.
Figure 6:
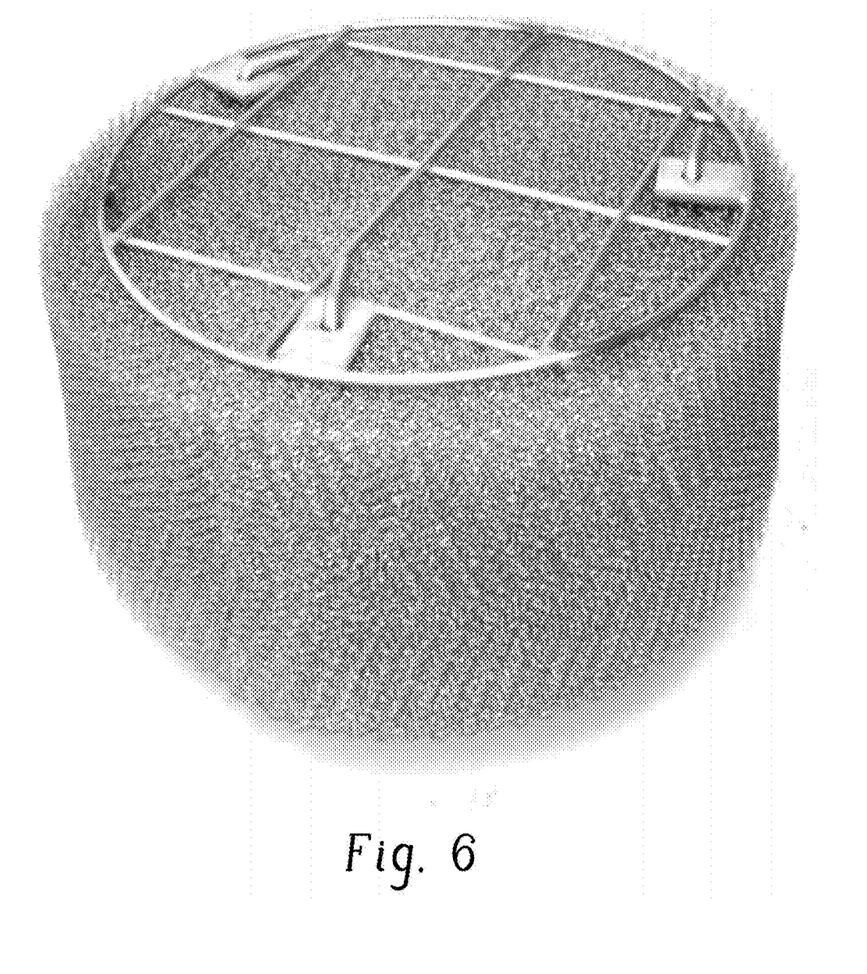

FIGS. 5 and 6 provide example form factors for coalescing materials that may be positioned within an exhaust path to encourage condensation of volatile component containing vapors.

Figure 7:
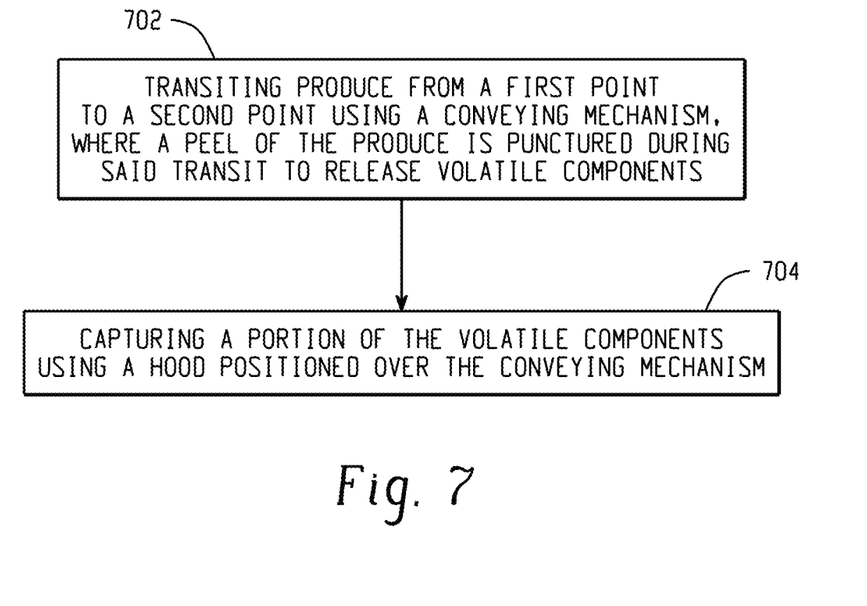
FIG. 7 is a flow diagram depicting a method for extracting volatile components from produce.

FIG. 7 is a flow diagram depicting a method for extracting volatile components from produce. The method includes transiting produce from a first point to a second point using a conveying mechanism at 702, where a peel of the produce is penetrated during said transit such that a portion of volatile components in the produce peel are released from the peel as a vapor. At 704, the vapor is captured using a hood positioned over the conveying mechanism, where at least a portion of the volatile components of the vapor are captured via the hood.

Systems and methods are provided for a system for extracting volatile components from produce. In an embodiment, a conveying mechanism is configured to transit produce from a first point to a second point, where a peel of the produce is penetrated during said transit such that a portion of volatile components in the produce peel are released from the peel as a vapor. A hood is positioned over the conveying mechanism for capturing the vapor, where the system is configured to extract at least a portion of the volatile components of the vapor captured via the hood.

In another example, a method for extracting volatile components from produce includes transiting produce from a first point to a second point using a conveying mechanism, where a peel of the produce is penetrated during said transit such that a portion of volatile components in the produce peel are released from the peel as a vapor. The vapor is captured using a hood positioned over the conveying mechanism, where at least a portion of the volatile components of the vapor are captured via the hood.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A system for extracting volatile components from produce, comprising:
   a conveying mechanism configured to transit produce from a first point to a second point;
   a mechanism for physically crushing or penetrating a peel of the produce during said transit such that a portion of volatile components in the produce peel are released from the peel as a vapor;
   a hood positioned over the conveying mechanism for capturing the vapor and directing the captured vapor to an exhaust path, wherein the system is configured to condensate at least a portion of the volatile components of the vapor captured via the hood; and
   an exhaust path with coalescing material positioned within the exhaust path wherein the coalescing material is configured to accelerate condensation of the captured vapor such that condensate falls from the exhaust path for capture.

2. The system of claim 1, further comprising a plurality of wash nozzles configured to spray a liquid onto the conveying mechanism, wherein the system is configured to capture a portion of the volatile components via the sprayed liquid, wherein the system is configured to output the sprayed liquid to facilitate extraction of the portion of the volatile components captured by the sprayed liquid.

3. The system of claim 2, further comprising a partial enclosure surrounding the conveying mechanism and the wash nozzles, wherein the hood is positioned above the partial enclosure.

4. The system of claim 3, further comprising a first covered chute via which the produce arrives near the first point, and a second covered chute via which the produce exits near the second point.

5. The system of claim 2, wherein the wash nozzles are components of a water drench system that comprises low volume cone type nozzles.

6. The system of claim 1, wherein the coalescing material comprises a packing material that includes a stainless steel, stainless steel alloy, titanium, or corrosion resistant metal gauze.

7. The system of claim 1, further comprising a fan configured to accelerate flow of air into the exhaust path.

8. The system of claim 1, wherein a portion of the hood is parabolic, dome, semispherical, trapezoidal, rectangular parallelepiped, trapezoidal prism, rectangular, tubular, or pyramidal in shape.

9. The system of claim 1, wherein the volatile components comprise organic volatile components or essential oils.

10. The system of claim 1, wherein the conveying mechanism comprises a plurality of rollers having teeth, spines, or an abrasive coating thereon or a conveyor belt having a rough, sharp, or uneven surface.

11. A system for extracting volatile components from produce, comprising:
- a conveying mechanism configured to transit produce from a first point to a second point;
- a mechanism for physically crushing or penetrating a peel of the produce during said transit such that a portion of volatile components in the produce peel are released from the peel as a vapor;
- a hood positioned over the conveying mechanism for capturing the vapor, wherein the system is configured to condensate at least a portion of the volatile components of the vapor captured via the hood;
- an exhaust path, wherein the hood is configured to direct the captured vapor to the exhaust path;
- a coalescing material positioned within the exhaust path; and
- an exhaust path spray nozzle configured to spray a liquid into the exhaust path after the coalescing material.

12. A system for extracting volatile components from produce, comprising:
- a conveying mechanism configured to transit produce from a first point to a second point;
- a mechanism for physically crushing or penetrating a peel of the produce during said transit such that a portion of volatile components in the produce peel are released from the peel as a vapor;
- a hood positioned over the conveying mechanism for capturing the vapor, wherein the system is configured to condensate at least a portion of the volatile components of the vapor captured via the hood; and
- a dehumidifier system associated with the hood comprising:
  - a steam jet;
  - a water-cooled condenser;
  - a secondary mist system;
  - a secondary packing material;
  - an accumulator for condensed vapors;
  - a pump; and
  - an automated valve for returning vapors either back to the hood or a receptacle for collection of volatile components.

13. A system for extracting volatile components from produce, comprising:
- a conveying mechanism configured to transit produce from a first point to a second point;
- a mechanism for physically crushing or penetrating a peel of the produce during said transit such that a portion of volatile components in the produce peel are released from the peel as a vapor;
- a hood positioned over the conveying mechanism for capturing the vapor, wherein the system is configured to condensate at least a portion of the volatile components of the vapor captured via the hood; and
- rotary wash nozzles configured to spray water or another cleaning liquid onto inside surfaces of the hood.

14. A method for extracting volatile components from produce, comprising:
- transiting produce from a first point to a second point using a conveying mechanism;
- physically crushing or penetrating a peel of the produce during said transit such that a portion of volatile components in the produce peel are released from the peel as a vapor;
- capturing the vapor using a hood positioned over the conveying mechanism that directs the captured vapor to an exhaust path, wherein at least a portion of the volatile components of the vapor are captured via the hood; and
- using an exhaust path with coalescing material positioned within the exhaust path to accelerate condensation of the captured vapor such that condensate falls from the exhaust path for capture.

15. The method of claim 14, further comprising, treating the vapor captured by the hood to condensate a portion of the captured vapor for collection.

16. The method of claim 15, wherein treating the vapor comprises directing the vapor through a coalescing material, wherein a liquid is sprayed onto or near the coalescing material.

17. The method of claim 14, further comprising:
- spraying the produce with a liquid as it is transited from the first point to the second point;
- collecting the liquid after is has been sprayed on the produce; and
- processing the collected liquid to extract a portion of the volatile components.

* * * * *